(12) United States Patent
McKay et al.

(10) Patent No.: US 7,483,875 B2
(45) Date of Patent: Jan. 27, 2009

(54) SINGLE SYSTEM FOR MANAGING MULTI-PLATFORM DATA RETRIEVAL

(75) Inventors: Christopher W. T. McKay, Auckland (NZ); James G. Douvikas, Danville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 10/350,327

(22) Filed: Jan. 24, 2003

(65) Prior Publication Data
US 2004/0148270 A1 Jul. 29, 2004

(51) Int. Cl.
G06F 7/00 (2006.01)
G06F 17/30 (2006.01)
G06F 17/00 (2006.01)
G06F 12/00 (2006.01)
G06F 15/16 (2006.01)
G06F 15/173 (2006.01)

(52) U.S. Cl. .................. 707/3; 707/1; 707/2; 707/4; 707/5; 707/10; 707/102; 707/104.1; 707/200; 707/203; 709/203; 709/217; 709/225; 709/227; 709/229

(58) Field of Classification Search ............ 707/1–5, 707/10, 102, 104.1, 200, 203; 709/203, 217, 709/225, 227, 229
See application file for complete search history.

(56) References Cited

U.S. PATENT DOCUMENTS

| | | | | |
|---|---|---|---|---|
| 4,882,703 A | * | 11/1989 | Nicolai | 707/3 |
| 6,078,914 A | * | 6/2000 | Redfern | 707/3 |
| 6,115,717 A | * | 9/2000 | Mehrotra et al. | 707/102 |
| 6,208,988 B1 | * | 3/2001 | Schultz | 707/5 |
| 6,292,800 B1 | * | 9/2001 | Eldreth | 707/10 |
| 6,523,022 B1 | * | 2/2003 | Hobbs | 707/3 |
| 6,662,194 B1 | * | 12/2003 | Joao | 707/104.1 |
| 6,944,612 B2 | * | 9/2005 | Roustant et al. | 707/3 |
| 7,275,105 B2 | * | 9/2007 | Bloch et al. | 709/227 |
| 2003/0023607 A1 | * | 1/2003 | Phelan et al. | 707/100 |

OTHER PUBLICATIONS

Taylor et al, 'An Integrated Information System on the Web for Catchment Management', Nov. 1998, ACM Press, pp. 8-13.*
Chang et al, 'Global Integration of Visual Databases', Feb. 1998, IEEE Conference Proceeding, pp. 542-549.*
Benitez et al, 'Using Relevance Feedback in Content-Based Image Metasearch', Jul.-Aug. 1998, vol. 2, Issue 4, pp. 59-69.*
Hutchison et al, 'Database Connection Pool Management', Dec. 1, 1998, IBM TDB, pp. 1-3.*

* cited by examiner

*Primary Examiner*—Uyen T. Le
*Assistant Examiner*—Cheryl M Shechtman

(57) ABSTRACT

A method of interacting with one or more data sources storing information and a system for performing the method thereof. The method receives a user request to interact with data source information, e.g. retrieve or update user contact information in a data source, identifies one or more data sources to interact with based on the user request, interacts with one or more of the identified data sources and receives a result of interacting with the identified data sources. Responsive to the user request, the method transmits the interaction result to the user. A system for interacting with a data source according to the above-described method includes: a memory storing (1) a data structure and (2) a sequence of executable instructions; and a processor for executing the instructions. The data structure stores information including user contact information and data source information. The sequence of executable instructions include a data retrieval application including the above-described method.

17 Claims, 7 Drawing Sheets

SINGLE SYSTEM FOR MANAGING MULTI-PLATFORM DATA RETRIEVAL

RELATED APPLICATIONS

This application is related to co-pending applications entitled, "Compressed Data Structure for a Database" (HP Reference 100204178-1); "Compressed Data Structure for Extracted Changes to a Database and Method of Generating the Data Structure" (HP Reference 100204180-1); "Portable Executable Software Architecture" (HP Reference 200207706-1); and "Method of Updating Data in a Compressed Data Structure" (HP Reference 200207707-1), all assigned to the present assignee, all of which are hereby incorporated by reference in their entirety, and all of which are being filed concurrently herewith. This application is also related to co-pending applications entitled, "E-service to Manage and Export Contact Information" (HP Reference 10992821-1), Ser. No. 09/507,043 filed Feb. 18, 2000; "E-Service to Manage Contact Information and Signature Ecards" (HP Reference 10992671-1), Ser. No. 09/507,631 filed Feb. 18, 2000; "E-service to Manage Contact Information and Track Contact Location" (HP Reference 10992821-1), Ser. No. 09/507,043 filed Feb. 18, 2000; and "E-service to Manage Contact Information with Privacy Levels" (HP Reference 10992822-1), Ser. No. 09/507,215 filed Feb. 18, 2000, all assigned to the present assignee, and all of which are hereby incorporated by reference in their entirety.

FIELD OF THE INVENTION

The present invention relates to a method and apparatus for a system for managing data retrieval, and more particularly, to such a method and apparatus wherein the system is able to retrieve data from multiple platforms.

BACKGROUND

Current methods for searching for information about an individual, e.g. telephone number, address, etc., where the information resides in multiple databases is to search each database singly, i.e. one database at a time. This approach is slow, requiring large amounts of time to search each individual database. Further, the approach is inefficient, repetitively and sequentially searching each database including inapplicable databases, e.g. searching for an individual's telephone number in an email directory.

Relatedly, a current approach for updating an individual's information is to submit changes to an administrator, who then updates the data on a central server. This approach is slow, and often the administrator will not receive changes until long after the change occurrence, if at all. In the period between the change in the employee's information and the update of the central server by the administrator, the employee is not locatable.

Tons of corporate contact information already exists in corporate databases. What is needed is a means of making this information accessible to all audiences the corporation desires to provide access. When you can find someone's contact information, mergers, office moves, and employee relocation usually render it out of date. The present invention fixes this by enabling the individual employee to make the appropriate updates to their contact information, as it changes.

SUMMARY

It is therefore an object of the present invention to provide a method of retrieving information from multiple platforms from a single system.

Another object of the present invention is to provide a mechanism for updating information about an individual by the individual.

The present invention provides a method and computer-readable medium containing instructions for a data-retrieval system enabling the display of information (such as the staff contact details for an entire organization) through a common interface, regardless of the number of different databases, directories, and formats in which the information is located. Further, individuals can update their own information, so that their contact information will never be out of date.

A method aspect includes interacting with one or more data sources storing information. The method includes receiving a user request to interact with data source information, e.g. retrieve or update user contact information in a data source. The method identifies one or more data sources to interact with based on the user request. The method interacts with one or more of the identified data sources and receives a result of interacting with the identified data sources. Responsive to the user request, the method transmits the interaction result to the user.

A system aspect includes a memory storing a data structure for storing information and a data structure for storing information and a sequence of executable instructions, and a processor for executing the sequence of executable instructions. The data structure stores information including user contact information and data source information. The sequence of executable instructions include a data retrieval application for interacting with one or more data sources responsive to the user request based on information stored in the data structure.

Many methods currently exist for storing and searching large blocks of information, e.g. contact information, including LDAP, RDBMS, and standard databases such as Oracle available from Oracle, Corp. and SQLServer available from Microsoft Corp. Advantageously, the present invention provides a single, unified system for retrieving information from all of these systems simultaneously. It is also extensible such that future data storage systems are searchable.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In conjunction with the above-referenced related applications, an embodiment of the present invention provides a single system for managing multi-platform data retrieval. Retrieved data may be presented to a user using the methods and apparatuses described in the co-pending applications listed above. Further, according to an embodiment of the present invention the single system enables a user to update information stored about the user.

Figure 1:
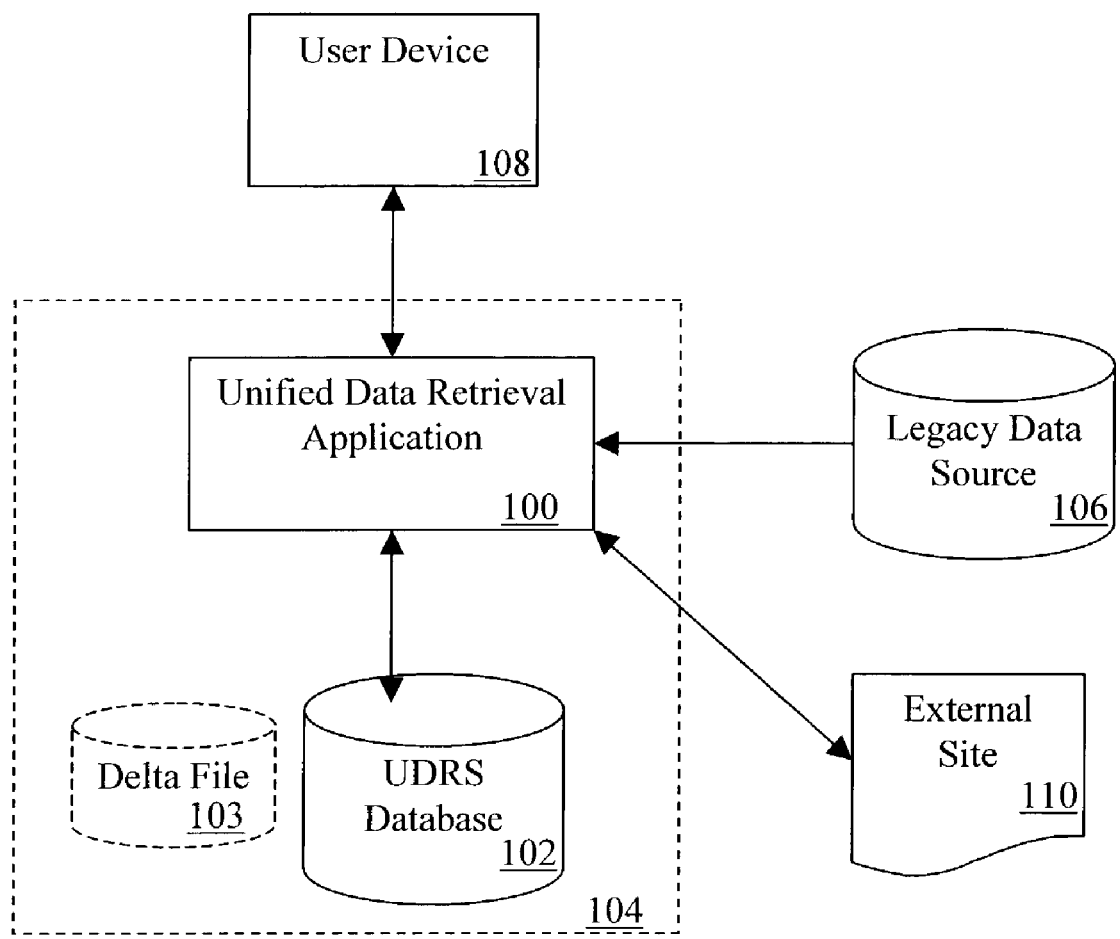
FIG. 1 is a high level block diagram of a logical architecture with which an embodiment of the present invention may be used.

FIG. 1 is a high level diagram of a logical architecture of the single system for managing multi-platform data retrieval in conjunction with which an embodiment of the present invention may be used. A unified data retrieval application 100, a unified data retrieval service (UDRS) database 102, and an optional delta file 103 (dashed line) in combination make up a unified data retrieval service 104. Delta file 103 is an optional component of UDRS 104. Delta file 103 is generated by a processor 504 (described in conjunction with FIG. 5 below) executing UDRS 104 instructions causing processor 504 to compare the data in older versions of UDRS database 102. The delta file 103 generation process is described in more detail in co-pending application titled, "Compressed Data Structure for Extracted Changes to a Compressed Data Structure and Method of Generating the Data Structure."

UDRS 104 accesses a legacy data source 106, e.g. lightweight directory authentication protocol (LDAP) directory servers, human resources databases, and other existing data sources internally located on a network, e.g. a company internal network, to obtain additional information for storage in UDRS database 102 and/or presentation to a user using a user device 108. The additional information may be obtained on a scheduled basis or responsive to a user query received from a user manipulating user device 108, e.g. a web browser executing on a handheld device, connected to UDRS 104. Additionally, requests may be received and responded to by UDRS 104 accessing an external site 110, for example accessing information stored at a web site, e.g. www.ecardfile.com. In this manner, the UDRS 104 obtains information from multiple data sources and provides information in response to user requests.

Figure 5:
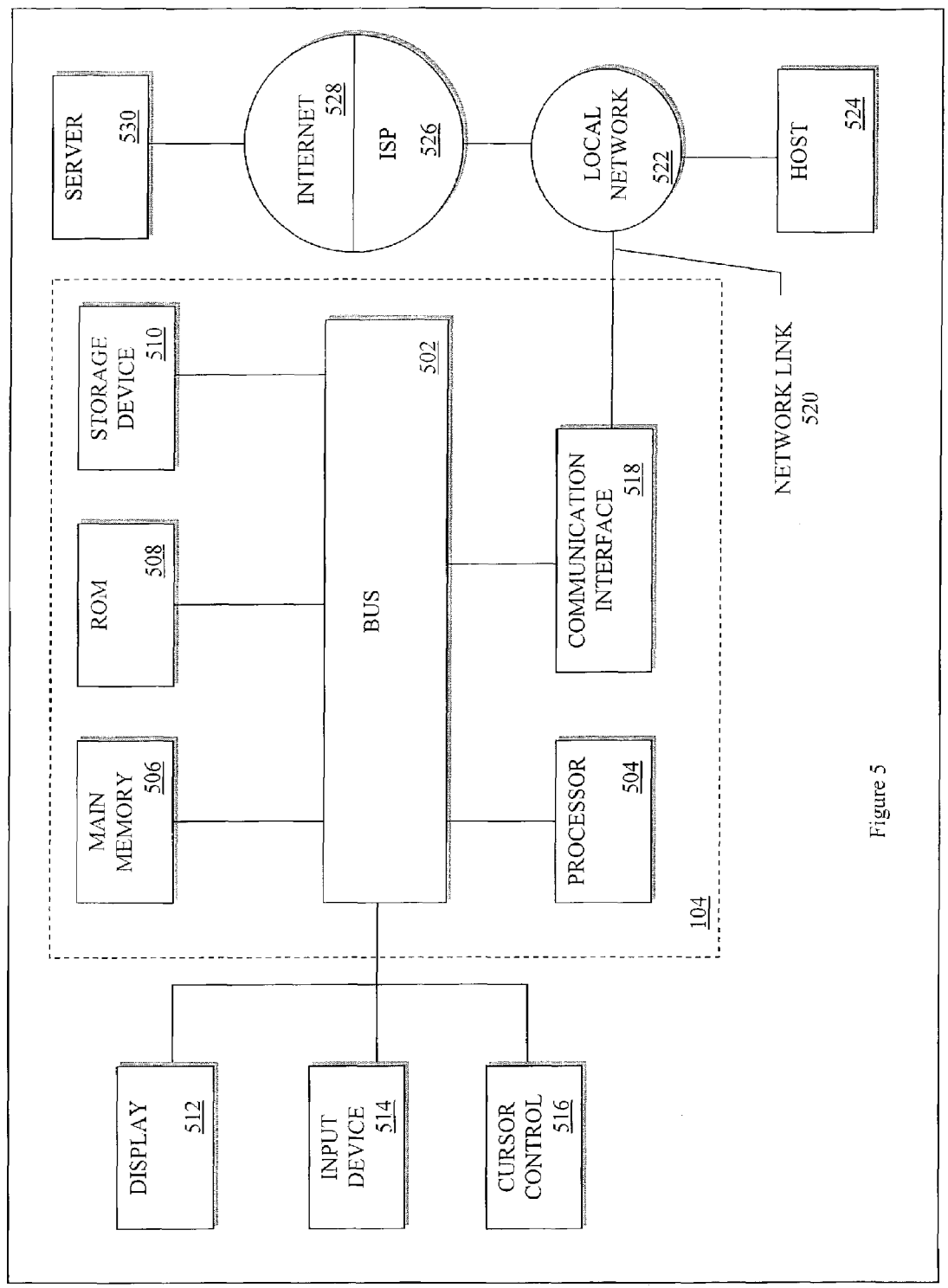
FIG. 5 is a high level block diagram of an exemplary computer upon which an embodiment of the present invention may be used.

FIG. 5 is a high level block diagram depicting an exemplary computer system 104, e.g. a server, upon which an embodiment of the present invention may be implemented. The present invention is usable with currently available personal computers, mini-mainframes and the like.

Computer system 104 includes a bus 502 or other communication mechanism for communicating information, and a processor 504 coupled with the bus 502 for processing information. Computer system 104 also includes a main memory 506, such as a random access memory (RAM) or other dynamic storage device, coupled to the bus 502 for storing data and a changes data structure, e.g. as embodied by UDRS database 102 and delta file 103 respectively, and instructions to be executed by processor 504. Main memory 506 also may be used for storing temporary variables or other intermediate information during execution of instructions to be executed by processor 504. Computer system 104 further includes a read only memory (ROM) 508 or other static storage device coupled to the bus 502 for storing static information and instructions for the processor 504. A storage device 510, such as a magnetic disk or optical disk, is provided and coupled to the bus 502 for storing data and the changes data structure, and instructions.

Computer system 104 may be coupled via the bus 502 to a display 512, such as a cathode ray tube (CRT) or a flat panel display, for displaying the results of a multi-platform data retrieval to a user. An input device 514, including alphanumeric and function keys, is coupled to the bus 502 for communicating information and command selections to the processor 504. Another type of user input device is cursor control 516, such as a mouse, a trackball, or cursor direction keys for communicating direction information and command selections to processor 504 and for controlling cursor movement on the display 512. This input device typically has two degrees of freedom in two axes, a first axis (e.g., x) and a second axis (e.g., y) allowing the device to specify positions in a plane.

The present invention is related to the use of computer system 104, such as the illustrated system of FIG. 5, to retrieve data from multiple platforms and enable a user to update information about the user. According to one embodiment of the invention, the data is retrieved from multiple platforms and data about a user is updated by the user by computer system 104 in response to processor 504 executing sequences of instructions contained in main memory 506 in response to input received via input device 514, cursor control 516, or communication interface 518. Such instructions may be read into main memory 506 from another computer-readable medium, such as storage device 510.

However, the computer-readable medium is not limited to devices such as storage device 510. For example, the computer-readable medium may include a floppy disk, a flexible disk, hard disk, magnetic tape, or any other magnetic medium, a compact disc read only memory (CD-ROM), any other optical medium, punch cards, paper tape, any other physical medium with patterns of holes, a random access memory (RAM), a programmable ROM (PROM), an electrically programmable (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 506 causes the processor 504 to perform the process steps described below. In alternative embodiments, hard-wired circuitry may be used in place of or in combination with computer software instructions to implement an embodiment of the present invention. Thus, embodiments of the invention are not limited to any specific combination of hardware circuitry and software.

Computer system 104 also includes a communication interface 518 coupled to the bus 502. Communication interface 508 provides two-way data communication as is known. For example, communication interface 518 may be an integrated services digital network (ISDN) card, a digital subscriber line (DSL) card, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. Of particular note, the communications through interface 518 may permit transmission or receipt of data retrieved from multiple platforms and updated data about a user. For example, two or more computer systems 104 may be networked together in a conventional manner with each using the communication interface 518.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 104, are exemplary forms of carrier waves transporting the information.

Computer system 104 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for retrieving data from multiple platforms and updating information about a user.

The received code may be executed by processor 504 as it is received, and/or stored in storage device 510, or other non-volatile storage for later execution. In this manner, computer system 104 may obtain application code in the form of a carrier wave.

Unified Service

Figure 6:
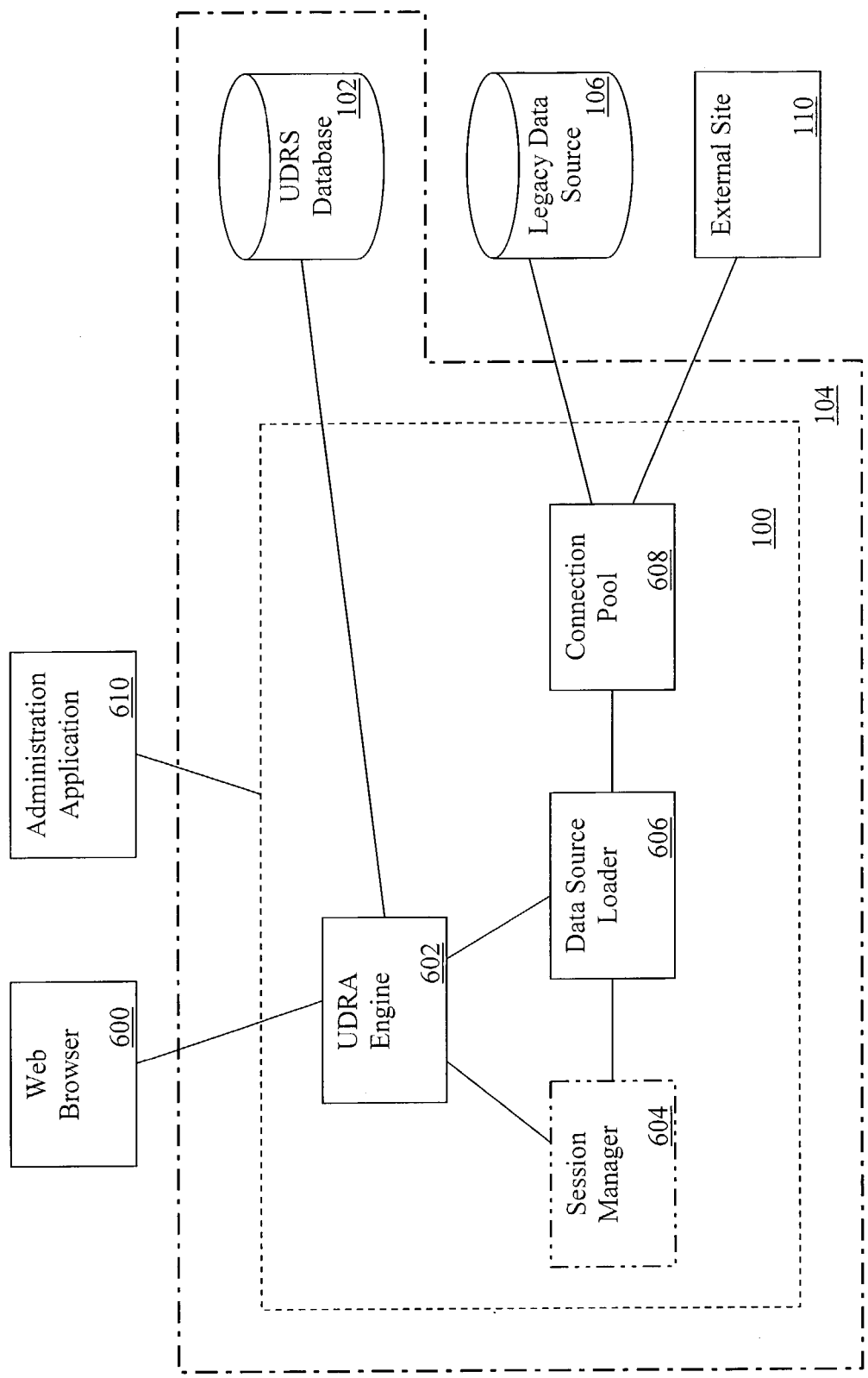
FIG. 6 is a block diagram of a logical architecture of an embodiment of the present invention.

An embodiment of the present invention includes application code, e.g. UDRS application 100, and a database, e.g. UDRS database 102, configured to enable searching of multiple data sources existing on multiple platforms and updating of information about a user. A description of the system depicted in FIG. 6 is provided below.

A logical architecture of a system used in an embodiment of the present invention includes a web browser 600 communicates user commands and input to processor 504 (FIG. 5) executing UDRS 104 (dashed line) instructions and receives information and formatting commands to display to a user (not shown). Web browser 600 may be executing on a separate computer or workstation communicating with UDRS 104 via known protocols or web browser 600 may be executing on a user device 108 (e.g. web browser 304) as described in co-pending application titled, "Portable Software Architecture." Web browsers are known to persons of skill in the art, e.g. Microsoft Internet Explorer available from Microsoft Corporation and Netscape Navigator available from Netscape, Inc.

Unified data retrieval application (UDRA) 100 receives input and commands from web browser 600 and, in response, transmits information and formatting commands to web browser 600 for display to the user. UDRA 100 includes a unified data retrieval application (UDRA) engine 602 for receiving and responding to user requests from browser 600, an optional session manager 604 (dash double dot line) for authenticating users, a data source loader 606 for handling query formation, and a connection pool 608. Additionally, an authorized user interacts with an administration application 610 to interact with UDRA 100 for managing and maintaining application 100 settings and UDRS database 102.

In an alternate embodiment, administration application 610 may be included as a part of UDRS 104 and accessed via web browser 600.

UDRA Engine 602 communicates with (1) session manager 608 for authenticating users, (2) an internal database, i.e. UDRS database 102, (3) web browser 600, and (4) multiple data sources, e.g. legacy database 106 and external site 110, via data source loader 606 in conjunction with connection pool 608 for obtaining additional information. UDRA Engine 602 receives information requests from a user manipulating browser 600 and transmits a response to browser 600. UDRA engine 602 operation is described in more detail below.

In a particular embodiment, UDRA 100 includes JAVA server pages and JAVA beans and connects to UDRS database 102 via JAVA database connectivity (JDBC) protocol, legacy database 106 via JAVA naming and directory interface (JNDI), and external site 110 via hypertext transport protocol (HTTP) or HTTP secure (HTTPS). Communication between UDRA 100 and session manager 604 is performed using remote method invocation (RMI).

Session manager 604 operates in conjunction with UDRA engine 602 to process user requests for information. Session manager 604 authenticates, verifies, and expires users. Operation of session manager 604 is known to persons of skill in the art. Session manager 604 is an optional component.

UDRS database 102 is a database, e.g. a relational database such as an Oracle or SQLServer-based database, and includes tables and indices according to the below description.

As is described below, data source loader 606 generates data queries in response to information requests received from UDRA engine 602. Data source loader 606 is in communication with UDRA engine 602, session manager 604, and connection pool 608.

Connection pool 608 creates, maintains, and removes connections between UDRA 100 and legacy data source 106 and external site 110. Use of connection pool 608 increases the response time for UDRA 100 to obtain information responsive to a user request. Data source loader 606 uses a connection from connection pool 608 to execute a generated data query in response to an information request received from a user via web browser 600.

Operation

Operation of the UDRS 104 is now described with reference to FIG. 6. In response to receiving a user request for information transmitted from web browser 600, UDRA engine 602 selects from configured meta search data, as described below, stored in UDRS database 102 and determines the data source(s), i.e. UDRS database 102, legacy data source 106, and external site 110, to search to satisfy the request. UDRS database 102 in a particular embodiment may be used to store employee data and can be searched using meta search data.

For each data source determined to be searched, UDRA engine 602 transmits the meta search data to data source loader 606 for generation and execution of the specified user query. A new data source loader $606_n$ is instantiated for each query and selects and creates connections from connection pool 608.

Data source loader 606 selects a connection from connection pool 608 and issues the generated query to the determined data source. UDRA engine 602 merges results received from multiple data sources, if necessary, into a single response, and extracts specific data fields for transmission and display to the user via web browser 600.

The data retrieval process described above is complicated by the order in which results are returned to UDRA 100, the uniqueness between the results, paging considerations, and differing search syntax arising from accessing different data sources. Advantageously, the above-described embodiment of the present invention overcomes each of these difficulties.

In a data update process, a user request to update information stored in a specified data source is received by UDRA engine 602, UDRA engine 602 selects from configured meta search data and determines the data source to be updated. UDRA engine 602 transmits the meta search data to data source loader 606 for generation and execution of the specified data update. Data source loader 606 selects a connection from connection pool 608 and transmits updated information to the connected data source.

Meta-Search Data

The meta-search data used by UDRA engine 602 is stored in UDRS database 102 and maps search fields to data source query fragments used by data source loader to 606 build queries.

For example, an embodiment of UDRS 104 may be configured as having two data sources: (1) an LDAP server and (2) a Relational DataBase Management System (RDBMS). If a received request specifies a search on firstname and lastname data residing on an LDAP server and also searching on job title information stored in the RDBMS the meta-search data may be configured as follows:

'LASTNAME'=>'(sn=?*)'

'FIRSTNAME'=>'(|(givenname=?*)(preferredGivenName=?*))'

'JOBTITLE'=>'LOWER(jobTitle) LIKE LOWER (?%)'

UDRA engine 602 matches search fields to specific data sources using additional configuration tables (not shown) stored in UDRS database 102. In the above example, LASTNAME and FIRSTNAME are mapped to a LDAP data source, values for the search fields are substituted for the '?' and the following query run against the LDAP server: '(& (sn=?*)(|(givenname=?*)(preferredGivenName=?*))', where sn=surname, a default attribute name in an LDAP schema.

Next, a query is executed by UDRA 100 against the second data source, i.e. an RDBMS data source: 'SELECT * from Users WHERE LOWER(jobTitle) LIKE LOWER(?%)' The first portion of the SQL statement, i.e. SELECT * from Users, is created by the author of the specific data source loader $606_n$. In the above example, the data source loader $606_n$ is created to search against a table in the internal database, e.g. UDRS database 102.

Actual attributes, fields and tablenames may vary depending on the data source loader 606 used to execute the query.

Data Source Loader

Data source loader 606 arbitrates between requests received from UDRA engine 602, individual data sources, and the returned result set received from data sources.

Different data source loader 606 versions for accessing different data sources handle the details of accessing different types of data sources. For example, it will be appreciated by persons skilled in the art that a different data source loader may be used for each data source and data source connection type.

Each data source, e.g. legacy data source 106 and external site 110, consists of a set of records. Each record is a collection of fields containing individual items of data. Data source loader 606 includes methods for performing a Get, a Put and a Query on the fields within each record in a particular data source. Get, Put, and Query are database-related terms known to persons of skill in the art and generally indicate retrieving data, storing data, and searching for data in a database, respectively. Data source loader 606 also optionally interacts with session manager 604 to provide authentication for checking logins and passwords of a user.

Data source loader 606 supports data sources accessible via JDBC and JNDI application programming interfaces (APIs). Data sources accessible via other protocols can be added to data source loader 606 capability by following the published API.

Information stored for data source loader 606 includes:
 network name of the server holding each data source (usually a URL);
 username and password needed to access the data source (if required); and
 specific information needed by the data source loader to access the data source.

Data source loader 606 can access an internal connection pool, i.e. connection pool 608, and maintain several connections to an external data server (eg DBMS or LDAP server). The connection health and status is monitored and broken connections recreated. Connections can also be recreated after a maximum connection time is reached.

The following methods are implemented in the data source loader 606.

Get

The get method receives a unique identifier value and searches an external name table, stored in UDRS database 102, for the relevant data sources and associated unique key values. For each data source identified, data source loader 606 uses the key value as a unique identifier to retrieve the record from the data source.

Put

The put method transmits a set of data source field names and values to a data source. The fields being updated are grouped by data source.

For each data source, a unique key value is retrieved from the external name table, stored in UDRS database 102, for the relevant data source. Data source loader 606 uses the key value as a unique key to update the record in the data source with the transmitted values.

If a data source is marked as read-only in UDRS database 102, data source loader 606 execution continues to the next data source.

Query

For the query method, all fields being searched by data source loader 606 are grouped by data source. For each data source required for the search, the data source loader retrieves meta-search data from UDRS database 102 and generates the relevant query command.

After generating the query, data source loader 606 uses an available connection from connection pool 608 and transmits the query to the data source. If all connections in connection pool 608 are in use and a maximum number of connections has not been reached, data source loader 606 will create a new connection as needed.

After the query is transmitted and results are received from the data source, data source loader 606 merges the received results into a single result set. Data source loader 606 determines the fields to be returned to UDRA engine 602. If required fields are not in the searched data source, values from the external name table are used to find a unique key to be used for any remaining data source. Data source loader 606 executes the get method, described above, on the data sources and the fields of data retrieved are added to the result set.

Merge

Query results from a data source loader 606 execution include the search results for each data source queried. The values in the query results are ordered using the data source field names.

Data source loader 606 merges the results into a single result set by using the unique data source key values held in the external name tables to perform a join operation. The sort order is determined by pre-configured settings stored in UDRS database 102.

Only the entries returned will be included in the results. For each of the entries returned, data source loader 606 constructs the super set of external names returned by the query process so far in order to be able to restrict later queries to only these entries.

Configuration

Figure 7:
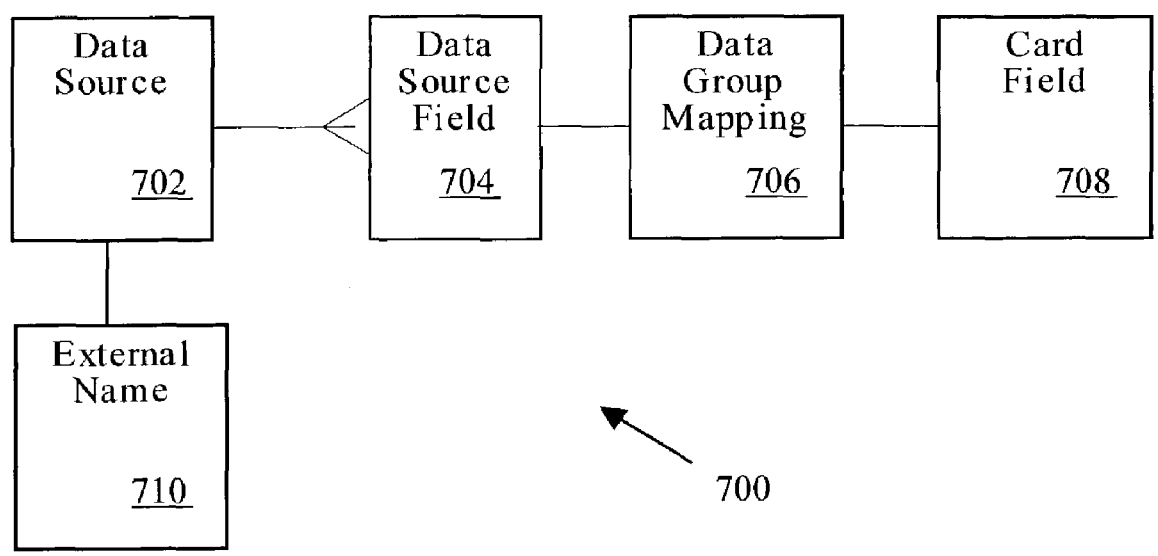
FIG. 7 is a high level block diagram of a structure for configuration information storage as used in an embodiment of the present invention.

UDRS database 102 includes configuration information for data sources accessible by UDRA 100. The structure of the configuration information is described with reference to FIG. 7 depicting a high level block diagram of a structure for storing configuration information as used in an embodiment of the present invention.

The structure (generally indicated by reference numeral 700) includes a data source record 702 including the fields listed in Table 1 below. The name column lists the name of the field in data source record structure 702, the type column identifies the data type (and size where appropriate) of the field, and the explanation column provides a brief description of the field.

TABLE 1

| Name | Type | Explanation |
|---|---|---|
| dataSourceId | PRIMARY KEY | Serial identifier |
| dataSourceName | NCHAR (10) | Name of the data source |
| url | NCHAR (100) | The URL for connecting to the data source. |
| userName | NCHAR (30) | The user used to access the data source |
| password | NCHAR (15) | The security credentials required to authenticate userName by the external data server |
| minconn | SMALLINT | Minimum number of connections to external data server. The number will grow to "maxconn" as required. |
| maxcoon | SMALLINT | Maximum number of connections to external data server. |
| logfile | NCHAR (100) | The full pathname to the file to be used for logging on this datasource. |
| maxconntime | INTEGER | Maximum lifetime of a connection in seconds before it is recreated. |
| connCheckTime | INTEGER DEFAULT 60 | Time increment in seconds between health checks of the connections. For example, the default is to check every 60 seconds. |

TABLE 1-continued

| Name | Type | Explanation |
|---|---|---|
| errorThreshold | SMALLINT DEFAULT 3 | Number of errors allowed to occur on a connection before it is recreated. Only used by the LDAP data source as a safeguard against intermittent problems. |
| appClass | NCHAR (100) | The loader class |
| appArgs | NCEAR (1024) | Arguments to be passed to the loader class. These will be different for each type of data source. |
| servers | NCHAR (1024) | URLs to the servers to be used by the connection pool. Used by the LDAP data source. |
| extNameLabel | NCHAR (100) | In order to join together the fields retrieved from each data source into a complete record (or card) there needs to be a field with a common value in each datasource. The field which contains this common value is known as the field containing the EXTNAME value. The extNameLabel names that field for this data source. |
| readWriteFlag | SMALLINT DEFAULT 1 | Whether or nor the data source is writable |

For each data source record 702, there are one or more data source fields records 704. Data source fields records 704 include the fields listed in Table 2 below.

TABLE 2

| Name | Type | Explanation |
|---|---|---|
| dataSourceFieldId | PRIMARY KEY | unique identifier |
| dataSourceFldName | NCHAR (100) | Name of the data source field within the data source itself. I.e. "uid" for LDAP |
| dataSourceId | FOREIGN KEY | Which data source this field belongs to |

For each data source fields record 704, there is a data group mapping record 706. Data group mapping record 706 includes the fields listed in Table 3 below.

TABLE 3

| Name | Type | Explanation |
|---|---|---|
| dataGroupMappingId | PRIMARY KEY | Unique identifier |
| cardFieldId | FOREIGN KEY | Link to search and display fields |
| dataSourceFieldId | FOREIGN KEY | Link to data source field |

For each data group mapping record 706 in the present embodiment of the present invention, there is a card field record 708. Card field record 708 includes the fields listed in Table 4 below.

TABLE 4

| Name | Type | Explanation |
|---|---|---|
| cardFieldId | PRIMARY KEY | Unique identifier |
| fieldName | NCHAR (20) | Friendly name |

TABLE 4-continued

| Name | Type | Explanation |
|---|---|---|
| displayOnly | CHAR (1) DEFAULT 'N' | The start of fields describing the search and display characteristics |

For each data source record 702, there is an external name record 710. External name record 710 includes the fields listed in Table 5 below.

TABLE 5

| Name | Type | Explanation |
|---|---|---|
| extNameId | PRIMARY KEY | Unique identifier |
| sysUserId | FOREIGN KEY | Link to a user in the system |
| extNameFieldId | FOREIGN KEY | Link to the unique identifier within a data source |
| extNameValue | NCHAR (100) | Value that uniquely links the record in a datasource to the user in the system. |

Figure 2:
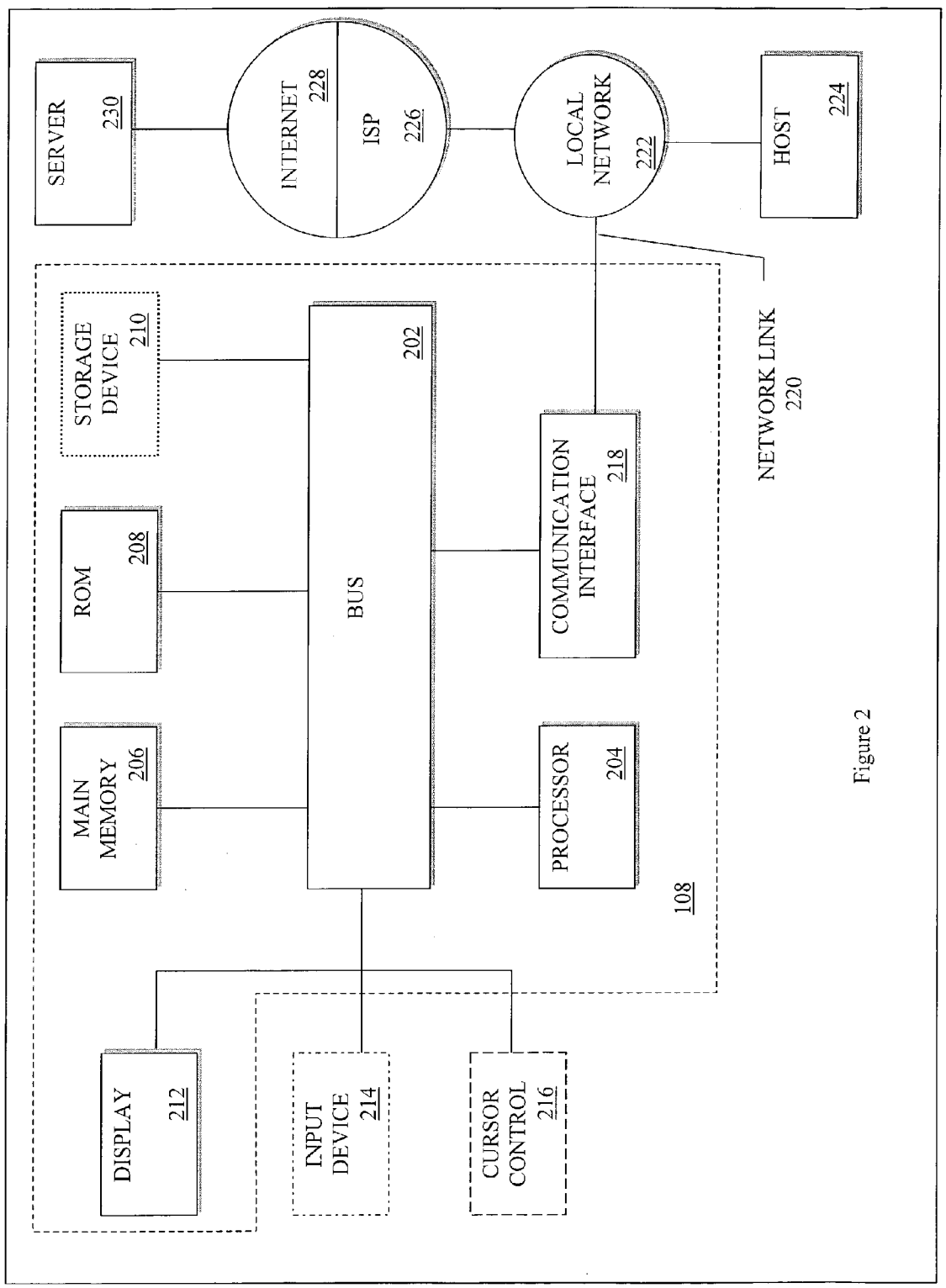
FIG. 2 is a high level block diagram of an exemplary device in conjunction with which an embodiment of the present invention may be used.

FIG. 2 is a block diagram depicting an exemplary computer or user device 108, e.g. a handheld device, in conjunction with which an embodiment of the present invention may be used. For example, a user may use a web browser executing on user device 108 connected to UDRS 104 to obtain contact information for another user or to update contact information for the user. The present invention is usable with currently available handheld and embedded devices, and is also applicable to personal computers, mini-mainframes, servers and the like.

Device 108 includes a bus 202 or other communication mechanism for communicating information, and a processor 204 coupled with the bus 202 for processing information. Device 108 also includes a main memory 206, such as a random access memory (RAM) or other dynamic storage device, coupled to the bus 202 for storing a data structure for a compressed database according to an embodiment of the present invention and instructions to be executed by processor 204. Main memory 206 also may be used for storing temporary variables or other intermediate information during execution of instructions to be executed by processor 204. Device 108 further includes a read only memory (ROM) 208 or other static storage device coupled to the bus 202 for storing static information and instructions for the processor 204. A storage device 210 (dotted line), such as a compact flash, smart media, or other storage device, is optionally provided and coupled to the bus 202 for storing instructions.

Device 108 may be coupled via the bus 202 to a display 212, such as a flat panel touch-sensitive display, for displaying an interface to a user. In order to reduce space requirements for handheld devices, the display 212 typically includes the ability to receive input from an input device, such as a stylus, in the form of user manipulation of the input device on a sensing surface of the display 212. An optional input device 214 (dash dot line), such as a keyboard including alphanumeric and function keys, is optionally coupled to the bus 202 for communicating information and command selections to the processor 204. Another type of optional user input device is cursor control 216 (long dash line), such as a stylus, pen, mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

Device 108 also includes a communication interface 218 coupled to the bus 202 and providing two-way data communication as is known in the art. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from device 108, are exemplary forms of carrier waves transporting the information.

Device 108 can send messages and receive data, including program code, through the network(s), network link 220 and communication interface 218. In the Internet example, a server 230 might transmit a requested code for an application program through Internet 228, ISP 226, local network 222 and communication interface 218. In accordance with an embodiment of the present invention, device 108 interacts with the UDRS 104, e.g. on a server 230, to retrieve contact information about a user stored on an external site 110 via Internet 228, ISP 226, local network 222, and communication interface 218.

The received code may be executed by processor 204 as it is received, and/or stored in storage device 210, or other non-volatile storage for later execution. In this manner, device 108 may obtain application code and delta file 103 in the form of a carrier wave.

Figure 3:
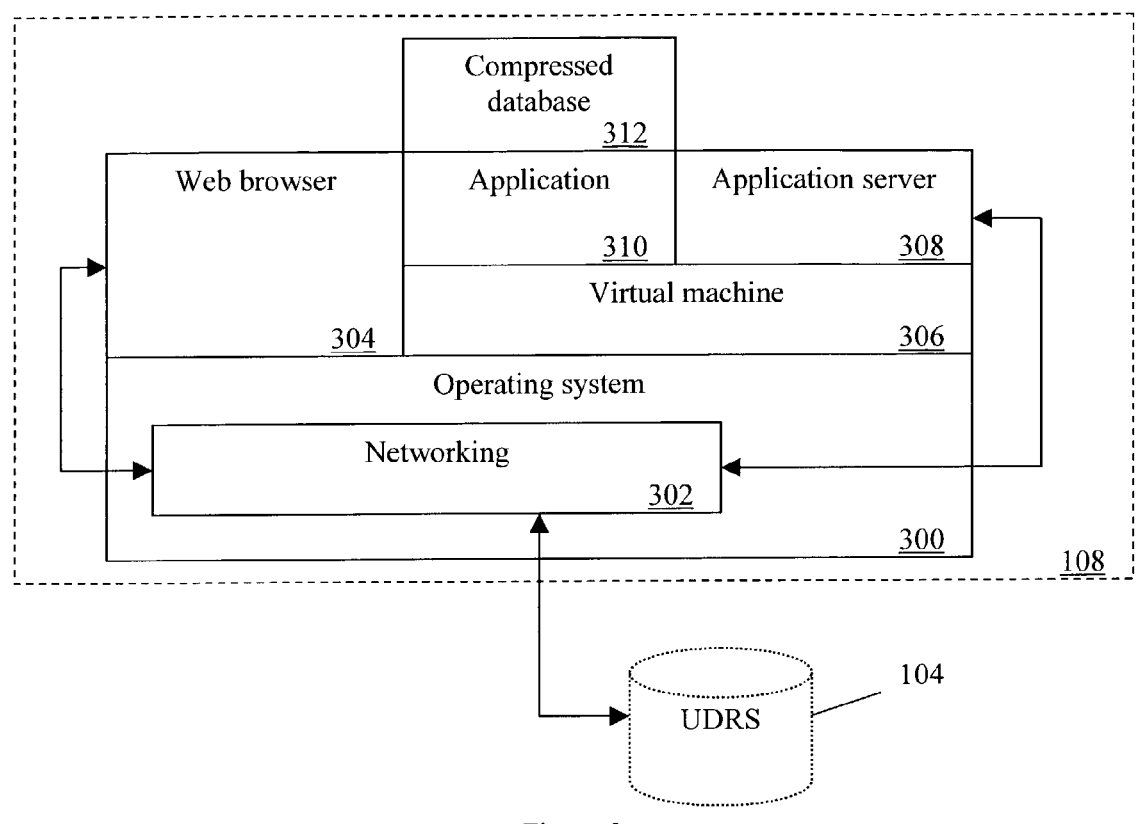
FIG. 3 is a high level block diagram of a portable software architecture usable with an embodiment of the present invention.

Referring now to FIG. 3, a high level block diagram depicts a portable software architecture as described in detail in co-pending application titled, "Portable Software Architecture," assigned to the present assignee, and hereby incorporated by reference in its entirety. A device 108 includes an operating system 300, stored in ROM 208 and main memory 206, having a networking component 302. The processor 204 executes operating system 300 instructions from memory 206 and/or ROM 208. Instructions for a web browser 304, as is known in the art, are executed by the processor 204 and access functionality provided by the operating system 300 including functionality of networking component 302. Although web browser 304 is shown and described as a native software application, it is to be understood that in alternate embodiments web browser 304 can be a java-based web browser executing on a Java virtual machine (JVM). As described in detail in the co-pending application, web browser 304 is a display and input interface for the user, i.e. the browser window is used to present information to the user and the same window is used to receive input from the user in the form of buttons, checkboxes, input fields, forms, etc.

Figure 4:
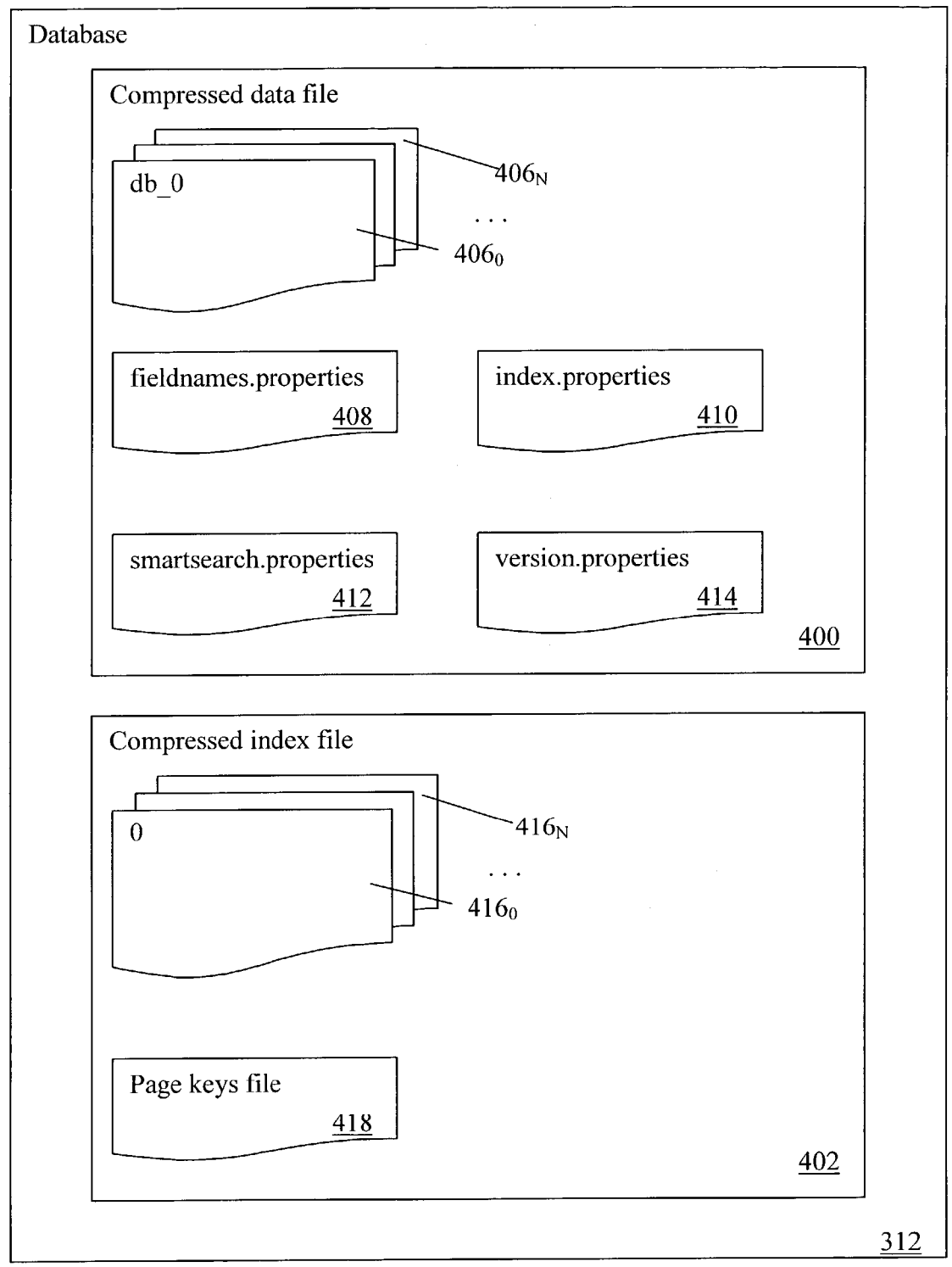
FIG. 4 is a high level block diagram of a compressed data structure for a database as used in an embodiment of the present invention.

Of note, FIG. 3 further includes a compressed database 312 according to an embodiment of the present invention for storing data accessed by the application 310. The compressed database 312 is utilized by the example software application of FIG. 3 and stored either in main memory 206 or storage device 210 of device 108. As depicted in FIG. 4 and described in detail in co-pending application entitled, "Compressed Data Structure for a Database," database 312 includes a compressed group of files collectively forming the database: a compressed data file 400 and a compressed index file 402.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of interacting with one or more data sources storing information, the method comprising:
   (A) receiving a user request to interact with data source information;
   (B) identifying one or more data sources to interact with based on the user request, wherein the identifying includes selecting from configured meta search data, wherein the meta search data maps a search field of the user request to a data source query fragment specifying a corresponding field of one of the one or more data sources;
   (C) interacting with one or more of the identified data sources based on the selected configured meta search data and the user request;
   (D) receiving a result of interacting with one or more of the identified data sources; and
   (E) transmitting the interaction result to the user.

2. A computer-implemented method as claimed in claim 1, wherein the user request to interact is from a group consisting of searching for information and updating information.

3. A computer-implemented method as claimed in claim 2, wherein the information is one or more user contact information.

4. A computer-implemented method as claimed in claim 2, wherein the interacting step (C) includes a get operation, a put operation, and a query operation performed on one or more of the identified data sources.

5. A computer-implemented method as claimed in claim 4, further comprising the step of:
   mapping a portion of a user request to one or more data source query fragments using the configured meta search data.

6. A computer-implemented method as claimed in claim 4, wherein the interacting step (C) includes creating, maintaining, and removing one or more connections to the one or more identified data sources.

7. A computer-implemented method as claimed in claim 6, wherein the one or more connections are configured for a specific data source.

8. A computer-implemented method as claimed in claim 7, wherein the one or more connections are configured for a specific protocol.

9. A computer-implemented method as claimed in claim 8, wherein the protocol includes JAVA database connectivity and JAVA naming, directory interface, and hypertext transfer protocol.

10. A computer-implemented method as claimed in claim 1, further comprising the step of:
    (F) authenticating users.

11. A computer-implemented method as claimed in claim 1, further comprising the step of:
    (G) merging the result received from one or more identified data sources into a single result set.

12. A computer-implemented method as claimed in claim 11, wherein the interaction result transmitted to the user is the single result set.

13. A computer-implemented method as claimed in claim 1, wherein the receiving a user request comprises receiving: (a) at least one search field mappable to a field of one of the one or more data sources and (b) user-specified information to be searched with respect to the at least one search field.

14. The computer-implemented method as claimed in claim 1, wherein the interacting comprises connecting to a data source using a connection from a connection pool including one or more configured connections.

15. The computer-implemented method as claimed in claim 14, wherein the interacting comprises generating, using a data retrieval engine, an interaction based on the user request and the data source information in order to receive and respond to the user request.

16. The computer-implemented method as claimed in claim 15, wherein the interacting comprises driving a connection from the connection pool to interact with the data source responsive to the interaction generated by the data retrieval engine.

17. A system for interacting with one or more data sources, wherein the system interacts with one or more of the data sources responsive to a user request, the system comprising:
    a memory storing:
        a data structure for storing information, wherein the information includes user contact information and data source information and wherein the data source information comprises information needed by the system to interact with at least one of the one or more data sources;
        a sequence of executable instructions comprising a data retrieval application for interacting with at least one of the one or more data sources responsive to the user request based on information stored in the data structure, wherein the sequence of executable instructions comprising a data retrieval application further comprises instructions for identifying at least one of the one or more data sources to interact with based on the user request, wherein the identifying instructions comprises selecting from configured meta search data, wherein the meta search data maps a search field of the user request to a data source query fragment specifying a corresponding field of at least one of the one or more data; and
    a processor for executing the sequence of executable instructions.

* * * * *

UNITED STATES PATENT AND TRADEMARK OFFICE
CERTIFICATE OF CORRECTION

PATENT NO. : 7,483,875 B2  
APPLICATION NO. : 10/350327  
DATED : January 27, 2009  
INVENTOR(S) : Christopher W. T. McKay et al.

Page 1 of 1

It is certified that error appears in the above-identified patent and that said Letters Patent is hereby corrected as shown below:

In column 10, line 28, delete "nor" and insert -- not --, therefor.

In column 14, line 58, in Claim 17, delete "data" and insert -- data sources --, therefor.

Signed and Sealed this

Eleventh Day of August, 2009

David J. Kappos
*Director of the United States Patent and Trademark Office*